(12) United States Patent
Polz et al.

(10) Patent No.: US 7,591,333 B1
(45) Date of Patent: Sep. 22, 2009

(54) FRONT HOOD ASSEMBLY

(75) Inventors: Andreas Polz, Gelsenkirchen (DE); Joerg Schneppenheim, Germering (DE); Peter Schlegel, Wuppertal (DE); Lazlo Kreth, Pfungstadt (DE); Ingo Renneisen, Hochheim (DE)

(73) Assignees: Edscha AG, Remscheid (DE); Adam Opel AG, Ruesselsheim (DE)

( * ) Notice: Subject to any disclaimer, the term of this patent is extended or adjusted under 35 U.S.C. 154(b) by 0 days.

(21) Appl. No.: 09/979,204

(22) PCT Filed: May 17, 2000

(86) PCT No.: PCT/DE00/01597

§ 371 (c)(1),
(2), (4) Date: Mar. 5, 2002

(87) PCT Pub. No.: WO00/69703

PCT Pub. Date: Nov. 23, 2000

(30) Foreign Application Priority Data

| May 17, 1999 | (DE) | ................................. | 199 22 107 |
| May 17, 1999 | (DE) | ................................. | 199 22 454 |
| May 17, 1999 | (DE) | ................................. | 199 22 455 |
| Oct. 8, 1999 | (DE) | ................................. | 199 48 461 |

(51) Int. Cl.
*B62D 25/10* (2006.01)
(52) U.S. Cl. .................................. 180/69.2; 180/69.21
(58) Field of Classification Search ................. 180/69.2, 180/69.21, 271, 272, 274, 275, 69.23, 68.4; 16/287 X, 288 X, 289, 294, 297, 306, 375, 16/370, 376, 371, 366, 222
See application file for complete search history.

(56) References Cited

U.S. PATENT DOCUMENTS

| 2,185,214 | A | * | 1/1940 | Mantle | ........................ | 16/288 |
| 2,520,921 | A | * | 9/1950 | Foster | ......................... | 16/288 |
| 2,548,492 | A | * | 4/1951 | Rivard et al. | ............. | 180/69.21 |
| 2,549,133 | A | * | 4/1951 | Scott | ........................ | 180/69.21 |
| 3,034,402 | A | * | 5/1962 | Alberetti | ...................... | 16/228 |
| 3,767,001 | A | * | 10/1973 | Chupick | .................. | 180/69.21 |
| 4,012,807 | A | * | 3/1977 | Kern | ............................. | 16/288 |
| 4,015,870 | A | * | 4/1977 | Stcherbatcheff et al. | ...... | 293/32 |
| 4,125,170 | A | * | 11/1978 | Botz | ....................... | 180/69.21 |
| 4,223,420 | A | * | 9/1980 | Yukimoto et al. | ............. | 16/288 |
| 4,249,632 | A | * | 2/1981 | Lucchini et al. | ............. | 180/274 |
| 4,679,841 | A | * | 7/1987 | Taunay | ...................... | 16/288 |
| 4,773,126 | A | * | 9/1988 | Voss | ............................ | 16/288 |
| 4,982,993 | A | * | 1/1991 | Okazaki et al. | ............. | 296/192 |

(Continued)

FOREIGN PATENT DOCUMENTS

DE 2711338 9/1978

(Continued)

*Primary Examiner*—Hau V Phan
(74) *Attorney, Agent, or Firm*—Davidson, Davidson & Kappel, LLC (57) ABSTRACT

A front hood assembly has a front hood of a motor vehicle that is hinged to the chassis of the motor vehicle via at least one multi-jointed hinge, said front hood being lockable via at least one hood lock. The at least one multi-jointed hinge comprises at least one connecting rod that is variable in length under the impact of a collision with a pedestrian. The assembly provides a protection for pedestrians that is technically feasible and can be implemented at low cost.

29 Claims, 9 Drawing Sheets

U.S. PATENT DOCUMENTS

| | | | | |
|---|---|---|---|---|
| 5,136,752 | A | * | 8/1992 | Bening et al. .................. 16/287 |
| 5,339,494 | A | * | 8/1994 | Esau et al. .................... 16/294 |
| 5,385,212 | A | * | 1/1995 | Cady et al. ............... 180/69.21 |
| 5,409,288 | A | * | 4/1995 | Masuda ................. 296/193.09 |
| 5,544,388 | A | * | 8/1996 | Chiura ........................ 16/289 |
| 5,557,829 | A | * | 9/1996 | Schoen et al. ................. 16/375 |
| 5,967,392 | A | * | 10/1999 | Niemi et al. .................. 16/289 |
| 6,007,057 | A | * | 12/1999 | Fuhrmann et al. ........ 267/64.15 |
| 6,021,606 | A | * | 2/2000 | Kos ............................. 16/289 |

FOREIGN PATENT DOCUMENTS

| | | |
|---|---|---|
| DE | 2711339 | 9/1978 |
| DE | 2737876 | 3/1979 |
| DE | 2841315 | 4/1980 |
| DE | 3047696 | 7/1982 |
| DE | 2922893 | 1/1989 |
| DE | 3916739 | 6/1991 |
| DE | 69400889 | 3/1997 |
| DE | 19721565 | 12/1997 |
| DE | 197 06 878 | 8/1998 |
| DE | 19710417 | 9/1998 |
| DE | 19712961 | 10/1998 |
| EP | 0509690 | 10/1992 |
| FR | 2690405 | 10/1993 |
| JP | 59-26370 | 6/1984 |
| JP | 4-212677 | 11/1992 |
| JP | 09315266 | 12/1997 |
| JP | 10258774 | 9/1998 |
| JP | 11115680 | 4/1999 |
| JP | 11291948 | 10/1999 |
| WO | 9718108 | 5/1997 |

* cited by examiner

FRONT HOOD ASSEMBLY

BACKGROUND OF THE INVENTION

The invention relates to a front-hood arrangement wherein a front hood of a vehicle is coupled to the frame of the vehicle via at least one multiple-joint hinge, which front hood furthermore can be locked by means of at least one hood lock.

By now, numerous safety devices, such as airbags and the like, for passengers in automobiles are known from practical applications. By contrast, protective measures for pedestrians who are hit by the front end of a passenger automobile have to date scarcely been proposed or implemented in practice. Accidents involving pedestrians which take place at speeds of up to 60 km/h have proven particularly problematical, since, if the pedestrian is hit head-on, his head often strikes the engine hood of the passenger automobile, and the pedestrian dies from his injuries. The seriousness of the injury results from the fact that although the front or engine hood, which is usually formed from thin metal sheet, would tend to bend, it then strikes parts which are arranged beneath the engine hood and in practice cannot be deformed or can only be deformed with difficulty, such as the engine block, the suspension-leg carrier, the air filter, the valve cover or the frame side and cross members of the vehicle. It would be desirable if the consequences of an impact in particular of the head of a pedestrian could be made less severe. By contrast, at speeds of over 60 km/h, the pedestrian, after he has been hit, is thrown over the vehicle.

DE-C-29 22 893 proposes that the engine hood and the wing, in the region of the joint formed between these two parts, be supported, by means of energy-absorbing U-sections which run along the two parts, on body components, and in the event of a collision these U-sections convert the impact into deformation energy. A first drawback of this arrangement is that considerable forces have to act on the sections in order to bend them. Moreover, these otherwise useless U-sections are expensive to procure and difficult to fit.

DE-A-27 37 876 describes an impact protection device which uses a prestressed pivot flap to displace a mesh-like absorption element but of an at-rest position, in which the mesh rests substantially on the front hood, into an absorbing position, which runs substantially in front of the windshield of the automobile. This device is used more to protect the windshield than the pedestrian from an excessively hard impact on the front hood. Moreover, any contact with the sensor which triggers the pivoting movement and is integrated in the front bumper can cause the mesh to be triggered, with the result that a whole range of situations arise in which the mesh completely blinds the driver.

DE-A-28 41 315 describes a safety device in which, in reaction to a signal from a sensor arranged at the front of a vehicle, to detect a collision with a pedestrian, the front hood is displaced out of an at-rest position into an impact position, which is raised with respect to the at-rest position, by a piston-cylinder unit, the displacement being effected by an energy store. During the raising operation, the front hood is pivoted about a horizontal pivot pin which is arranged at the front of the vehicle.

DE-A-197 10 417 describes an arrangement for lifting the front hood in which pivoting about a horizontal pivot pin arranged at the front of the vehicle is triggered by the same pneumatic spring which also assists with the raising of the front hood which is coupled to the other end.

DE-A-197 21 565 describes a safety device on motor vehicles for raising the front hood in which the raising of the front hood takes place in a speed-dependent manner by means of a mechanism which is integral with the hood lock. For this purpose, either the unlocking of the lock which is acted on by a compression spring, which for safety reasons is normally triggered from the driver's compartment, is triggered by a sensor which is triggered by an impact, or alternatively, particularly at relatively high speeds, a piston-cylinder unit which is integrated in the catch bolt of the hood lock is expanded by a propelling charge. A first drawback of this arrangement is that the force required to close the front hood must not exceed a defined threshold, in order to allow the driver to close the front hood with ease. Since the forces which strike in the event of an accident involving a person are considerable, the front hood is pressed down rapidly, and the known injuries occur, in particular in the region of the head. Providing a propelling charge in order to expand a piston-cylinder unit also causes problems, since the service life of this charge, in particular in a relatively unprotected arrangement, is limited, and the charge is difficult to exchange. Moreover, there is a risk of the compression spring and the piston-cylinder unit being triggered simultaneously, with the result that the opening of the front bonnet would become so great that the airstream would bring the hood into contact with the windshield, thus preventing the driver from being able to see.

DE-A-27 11 338 describes a device for damping the impact of a pedestrian, in which an airbag is arranged in the region of the cowl, the filling of which airbag is triggered by a sensor signal. In this case, the airbag may be arranged in such a way that, at the same time, it raises a part of the front hood; to do this it overcomes a spring force which preloads two links, which are connected to one another via a rotation point and one of which is arranged rotatably on the front hood and the other of which is arranged rotatably on a fixed part of the motor vehicle, into an angled position. Furthermore, it is proposed to arrange resilient profiled bodies in strip form in the manner of a seal between hood and side parts, in order in this way to provide further protection in the event of an impact.

DE-A-27 11 339 describes a front hood which is coupled at the front side and in which the coupling is designed to be resilient, in such a manner that it allows a horizontal displacement of the front hood through the impact of a pedestrian, the front hood which is displaced toward the rear being connected at the rear side to one end of a rigid locking element, the other end of which, in the event of displacement of the front hood, is displaced upward and toward the rear in a guide curve in such a manner that the front hood executes an upward movement. This lifting only takes place if horizontal displacement of the front hood has actually occurred, which is not always the case, for example, in the event of impacts of children.

EP-A-0 509 690 describes a front hood, which at its front side is coupled to the vehicle structure in such a manner that, as a result of an impact, the front hood is displaced toward the rear, the closure or pivot means arranged at the rear side, as a result of a movement of the front hood toward the rear, triggering an upward pivoting movement of the front hood, so that the deformation travel of the hood is increased in the event of the impact of a pedestrian. The pivoting movement is guided, for example, by a four-joint hinge, which is otherwise used to pivot the front hood when it is desired to release access to the engine and other parts. In this case too, the front hood is only lifted in the event of a very substantial displacement of the front hood, while a weak impact does not displace the front hood toward the rear and therefore upward.

DE-A-197 12 961 describes the arrangement of a front hood on a vehicle in which a hinge is arranged on a hinge mount, which hinge, in the event of a collision with a pedestrian, is pivoted upward in order to raise the front hood. A problem of this arrangement is that the hood lock for the front hood defines a pivot axis which does not allow optional displacement of the hinge mount, and consequently the hinge mount described is, for example, blocked.

Overall, as yet no solution has been proposed which proposes an inexpensive arrangement, which can be readily restored after use and which is so well developed that it could be used in mass-produced vehicles.

SUMMARY OF THE INVENTION

It is the object of the invention to propose a front-hood arrangement that supplies pedestrian protection that can be achieved inexpensively and on an industrial scale.

This object is achieved, according to the invention, for the front-hood arrangement described at the beginning, in that the at least one multiple-joint hinge has at least one link which is designed to change in length under the load of an impact of a pedestrian.

The design of the multiple-joint hinge with at least one link designed to be of variable length represents an embodiment of the basic idea of the invention, according to which, in the event of an excessive load, the distance between the two coupling points of the at least one link can be changed, in order, in this way, to release the multiple joint for a further pivoting curve which differs from the actual pivoting curve of the multiple joint.

The front-hood arrangement according to the invention advantageously has three limit positions; in addition to the known closed position, in which the front hood is locked, this being the position which is adopted while the vehicle is driving, and the open position, which is likewise known and in which access to the engine compartment is opened up for an operator, there is also a third limit position, which can be described as the overload position and which is explained in detail below, in order to satisfy the demands imposed on the front hood drawing back in the event of the impact of a pedestrian.

The multiple-joint hinge may advantageously be designed as a four-joint hinge, although it is alternatively possible for it to be designed as a seven-joint hinge or with only one link as a two-joint hinge.

In the starting position, the front hood is locked by the hood lock, which is preferably arranged in the front region of the front hood, the four-joint hinge, comprising two links and two hinge parts, which are connected to the links in an articulated manner at the rotation points arranged in the end regions of the links and which are connected, by known mounting means, to the front hood and to the body of the vehicle, defining a pivoting path of the front hood, which allows free, reciprocating pivoting of the front hood between the open position and the closed position to optionally open up access to the engine compartment. In the open position, which is preferably reached with the assistance of a spring, for example a pneumatic spring, the front hood can be held by means of a rod between the body and the front hood, in order to allow an operator access without danger. Alternatively, when a past-dead-center position of the four-joint hinge or of the four-joint hinges is reached, since generally one hinge is arranged at both rear corners of the front hood, which in developed view is of square design, the front hood can be held without external aids.

While the vehicle, which expediently is a passenger automobile, is driving, the front hood is in its closed position and is locked by the hood lock, so that the engine compartment, in which a series of hard components, such as the engine block, the suspension-leg cover and others are arranged, by the front hood in the manner of a protective cover, which is arranged at a sufficient distance from the parts which are dangerous to the head of a pedestrian at least in the event of an impact, on the underside of the front hood has a space optionally lined with a foam, which is designed to be compressible and if appropriate absorbs impact and/or sound energy, or has a free space.

Starting at least from the closed position of the front hood, the front-hood arrangement according to the invention allows the front hood to be displaced toward the overload position, in which the distance between the front hood and the dangerous parts of the engine compartment is reduced; according to the invention, in the event of an overload, the four-joint hinge, as well as, if appropriate, further parts of the front-hood arrangement, for the displacement toward the overload position or into the overload position, convert a proportion of impact energy from the pedestrian into displacement or deformation energy which is such that the impact, when the vehicle is driving at a speed of up to 60 km/h, is very likely not to cause the death of the pedestrian.

Under the load of an impact of a pedestrian, the front hood, by deformation of at least one link of the four-joint hinge, is displaced toward the overload position, the displacement travel, as a result of the impact energy being converted due to the gradual yielding of the front hood, alleviating the impact and thus reducing the severity of the impact. It will be understood that a deformation energy of the front hood itself is to be taken into account in this context, this generally only being possible to a limited extent by clamping into a hood lock and two four-joint hinges.

To allow the translational movement of the front hood toward the overload position, at least one of the links of the four-joint hinge is designed to change length, the nature of the change in length, as long as it does not involve a conversion of energy, not being fixed to any specific technical configuration. Both reversible changes in length, by providing energy stores in the manner of springs or the like, and irreversible changes in length produced by casings of the link which can be blown off, compressible foam, metal alloys, which at least in sections allow a change in the length given suitable constriction of the cross section of the link, or alternatively links which are designed as a clamping fit, are fitted together in two parts and in which the widening of the press fit supplies the required deformation energy, are suitable. Also, it is of no importance whether one of the two links of the four-joint hinge is lengthened for this purpose or the other of the two links is shortened, e.g. compressed, for this purpose.

Expediently, the two links of the four-joint hinge are designed to be of variable length; in this case, both a combination of two links which can be extended—if appropriate to different extents—or one extendable link and one compressible link are suitable. In addition to the advantage that with two links which are designed to be of variable length the impact energy is distributed over both links, and therefore the front-hood arrangement can be dimensioned better, it is in this way also easier to absorb an asymmetric impact on the front hood, and the displacement travel of the front hood required to convert the impact energy can accordingly be somewhat shorter, with the result that the distance which has to be left between the front hood and the hard parts of the engine compartment can be reduced and the drag coefficient of the vehicle is less impaired. Moreover, it is then possible to provide the translational movement about the intermediate links in such a way that, in the event of pivoting toward the overload position, the pivoting movement about the hood lock defines a rotary movement, so that there is no need to provide for a horizontal shift of the front hood.

Preferably, the at least one link which is designed to be of variable length comprises an integrated energy store which is stressed by the impact energy and therefore effects a reversible change in length of the link. This refinement is particularly advantageous since, although any unintentional changes in length caused by other overloads, for example by children jumping up and down on the front hood or the like, would lead to a pivoting movement toward the overload position of the front hood, following the unintentional stress the front hood can pivot back into the closed position. This means that the readiness of the vehicle to drive after an overload or an impact can rapidly be restored and, moreover, the four-link hinge can still be used with unchanged characteristics even after a first impact of a pedestrian on the front hood. The energy stores are expediently arranged in the link in such a way that, in the closed position, they support the holding force of the front hood to such an extent that in the event of a head-on collision passenger protection is not reduced.

Expediently, the energy store is a spring which may be designed equally well as a tension spring or a compression spring and therefore executes a change in length which takes place in the direction of the force which stresses it. Therefore, a spring can advantageously be used to provide a design involving either compression or lengthening of the link. The spring may, for example, be a coil spring or the like. If it is provided for the link to be lengthened, the link may be constructed in such a manner that the springs, which are preferably designed as mechanical coil springs, in each case in two partial links which bear against one another, are arranged in an associated cutout in each case facing the other partial link, the join between them being virtually invisible and extending only in the event of an overload.

The energy store may furthermore comprise a deformable constituent which converts the impact energy into deformation energy by irreversible, plastic deformation of the deformable component of the link. In this case, as a result of the link being changed in length, the impact energy is reduced by the plastic deformation of the deformable component, the resulting change in length or the resulting part of the change in length of the link being reversible only by a further plastic deformation, for example with the aid of a suitable tool, for which reason, for this component, after an impact the front hood remains permanently displaced toward its impact position.

A preferred deformable component is a covering of the joint made from foam or plastic which can be deformed plastically; it is also possible for the entire link to consist of this material. Alternatively, it is possible for the at least one link which is designed to be of variable length to be designed as a link which can be separated into two short link parts which, by means of an injection-molded plastic cladding, define a desired breaking point which breaks in the event of the normal load being exceeded and thus release the four-joint system. This variant has the particular advantage that the four-joint hinge can be restored by exchanging the broken link; alternatively, it is also possible to exchange the entire four-joint hinge and for the defective link to be replaced by recycling. This system has the particular advantage that, in the event of a head-on collision with another vehicle or against a stationary obstacle, the front hood is still held by the other, rigid link, which considerably reduces the risk of the front hood forcing its way through the front window and thus entering the passenger compartment of the vehicle.

It will be understood that the provision of a plastically deformable injection-molded plastic cladding is equally suitable for tensile and compressive loads. As an alternative to the above solution with a plastic cladding, it is also possible to use link parts with connections which can be sheared off, telescopic links which can be deformed counter to an elastic or plastic resistance, and other links which are designed to change in length.

In the case of a telescopic link, the link part which accommodates the other link part is preferably, as a hollow cylinder, filled with one or more fluid or pasty media, these media being compressed in the cylinder through a restrictor as a result of the accommodated link part penetrating into the cylinder, so that by suitably selecting the composition of the media and the restriction, the resistance of the telescopic link can be designed both in such a manner that initially a minimum load has to be overcome and in such a manner that the displacement travel available is optimized. For this purpose, the cylinder may also comprise a mechanical or pneumatic spring.

It will be understood that where the above text refers to a link which is designed to be of variable length, this is not intended to be restricted to a link which can be elongated in the axial direction, but also is intended to mean a link whose curvature can also be varied. In four-joint hinges used in practice, the links of these hinges generally have a curvature, so that the variable length comprises links with a variable distance between the two rotary joints of the link.

It will be understood that the energy store of the link which is designed to be of variable length may comprise both a reversible component and, at the same time, an irreversible component, with the result that the adapting and designing of the four-joint hinge to the expected impact and to the distance of the impact on the front hood, which differs in size from vehicle model to vehicle model, from the hinge parts, which are mounted on the front hood, of the four-joint hinges can be taken into account, and furthermore standardization can be achieved by different designs substantially of the spring, with a plastically deformable component which it otherwise identical for various models of vehicle.

It will be understood that a front-hood arrangement whose translational movement is completely reversible is particularly preferred, since in particular an arrangement of this type can easily be checked for correct operation and reliability during routine tests carried out on the vehicle for technical inspection thereof. Therefore, it is expedient if, when using components which undergo an irreversible change in the event of a collision, these components are arranged in such a manner that they can be checked for damage by visual inspection.

To ensure a displacement starting from the closed position toward the open position or toward the overload position of the front hood relative to the body of the vehicle, it is expedient for the four-joint hinge, at the hinge part which bears against the body, to be arranged in a fixed position on the body of the vehicle, so that the pivoting movement about the body-side rotation points of the links can be carried out.

According to a preferred refinement of the invention, it is possible, in the event of an impact, for one of the links of the four-joint hinge to compress an energy storage unit, which is prestressed toward the functional position of the link, counter to its prestress in order to at least partially compensate for the change in the at least one link. The rotation point of the link, which during displacement out of the closed position to the open position of the front hood and back is prestressed by the energy storage unit, remains unchanged and is only displaced onto the prestressed energy storage unit, stressing the latter, in the event of a pedestrian impact, with the impact energy being partially absorbed, with the result that the preferably rigid link, together with the associated energy storage unit, compensates for the horizontal displacement of the front hood on account of the at least one link and therefore, even in the event of a head-on collision, advantageously prevents the front hood from being forced into the windshield and therefore into the passenger cell of the vehicle.

In its closed position, the hood lock is expediently designed in such a manner that it allows horizontal displacement of the front hood in order to allow the rotation points, which have been displaced further toward the rear on account of the at least one link in the event of an overload and act on the front hood, of the at least one link by a corresponding translational movement of the front hood toward the rear. For this purpose, the hood lock may be designed in such a manner that it is designed in a standard way for unlocking, but in the closed and locked state provides a horizontal yield space which expediently allows displacement of the front hood toward the rear counter to a resistance, which is likewise reversibly or irreversibly deformable. For example, the yield space may form the receptacle for a compression spring which, for example, prestresses a holding part of the front hood, which is designed as a bracket part and is held locked in the lock, toward a position which allows unlocking and is stressed in the event of a collision with a pedestrian, with the result that some of the impact energy is absorbed. This measure is particularly advantageous if it is necessary to cushion the impact of the head of a child, which is expected to be predominantly in the front region of the front hood. Furthermore, it is possible to line the yield space with a plastic-foam part which crumbles under the pressure of an impact and can be replaced with a spare after the impact, with the result that the ability of the front-hood arrangement to function is retained for further impacts even after a first impact.

Further advantages and features of the invention will emerge from the following description and from the dependent claims.

BRIEF DESCRIPTION OF THE DRAWINGS

The invention is explained in more detail below with reference to the appended drawings and on the basis of preferred exemplary embodiments of a front-hood arrangement according to the invention.

DETAILED DESCRIPTION OF THE INVENTION

Figure 1:
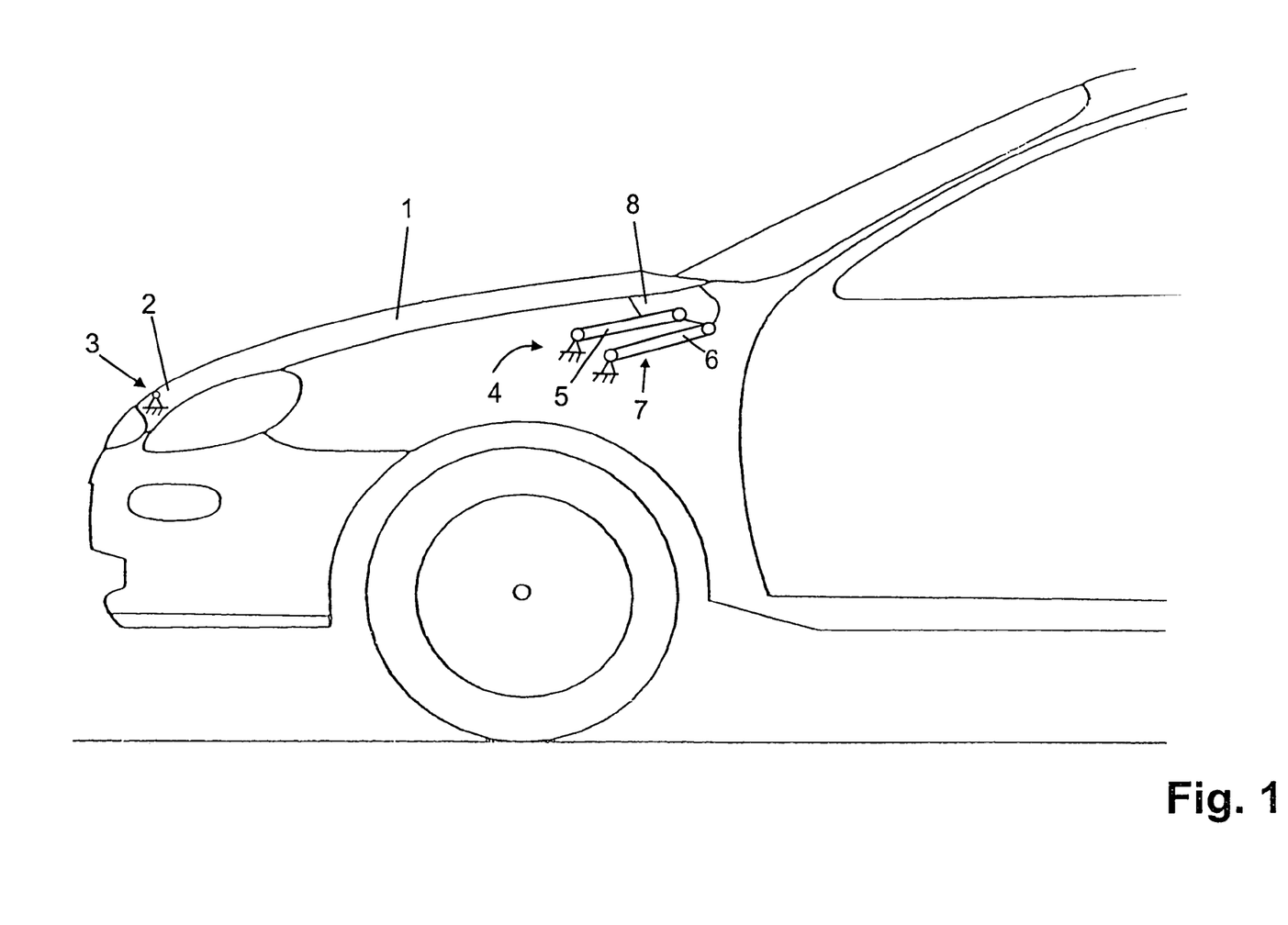
FIG. 1 shows a diagrammatic side view of part of a vehicle with a preferred exemplary embodiment of a front-hood arrangement according to the invention.

FIG. 1 shows a side view of the front part of a motor vehicle, the engine compartment of which can be closed off by a front hood 1. The front hood 1 is locked and unlocked by means of a hood lock 3 arranged in the front region 2 of the front hood 1 and, on its side which faces the driver's compartment, is coupled at each edge side to the frame of the body by means of one of two hinges 4. The hinge 4 is in the present case designed as a four-joint hinge which comprises a longer link 5 and a shorter link 6, the joints of which are pivotably coupled to a part 7 which is secured to the frame and to a part 8 which is arranged on the front hood 1. The front hood 1, by pivoting about the joints on the frame part 7, can be pivoted out of the closed position illustrated in FIG. 1 into its open position and back again.

Figure 2:
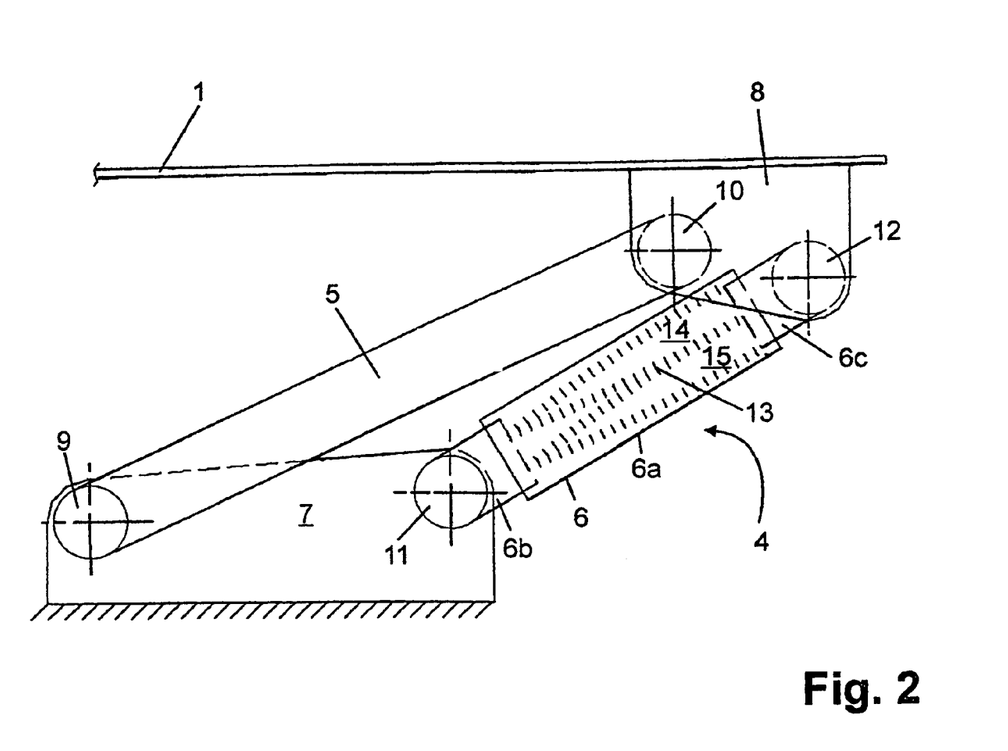
FIG. 2 shows a diagrammatic side view of a first embodiment of a four-joint hinge of the front-hood arrangement from FIG. 1, with the front hood closed.

FIG. 2 shows a first preferred embodiment of the hinge 4, the rotary joints of the longer link 5 being denoted by 9 and 10 and the rotary joints of the shorter links being denoted by 11 and 12. It can be seen that all four links 9 to 12 are arranged in a fixed position in the associated frame part 7 or front-hood parts 8.

While the longer link 5 is designed as a rigid link, the shorter link 6, in a central region 6a which is adjoined by the end pieces 6b and 6c which have the same action as the rotary joints 11, 12, is equipped with an integrated energy store 13 which is designed as a double spring and allows a change in the length of the shorter link 6, in such a manner that the distance between the axes of the rotary joints 11 and 12 can be changed. To achieve this, the energy store 13, which is formed by means of strong tension springs, has to be loaded to such an extent that its prestress is overcome, the load being such that it must significantly exceed the dead weight of the front hood 1 arranged on the hood part 8. In addition to a compression spring 14, a tension spring 15 is also integrated in the section 6a of the shorter link 6, so that the preset distance between the axes of the rotary joints 11, 12 is maintained by the length of the shorter link 6 shown in the load-free state. As can be seen more specifically from FIG. 3, part of the dead weight of the front hood 1, in the open position of the four-joint hinge 4 from FIG. 2 illustrated in FIG. 3, exerts a load on the shorter link 6, which is only intended to yield to an insignificant extent under this load, in order to avoid a pivoting-tilting movement of the front hood 1. The compression spring 14 and the tension spring 15 are diagrammatically indicated in FIGS. 2 to 4 and, in this diagrammatic illustration, serve only to illustrate the different load-free and loaded states of the four-joint hinge 4. It can be seen in particular in FIG. 3 that both in the closed position, which is indicated by the symbol S, and in the open position, which is indicated by the symbol O, the length of the shorter link 6 remains substantially unchanged.

Figure 4:
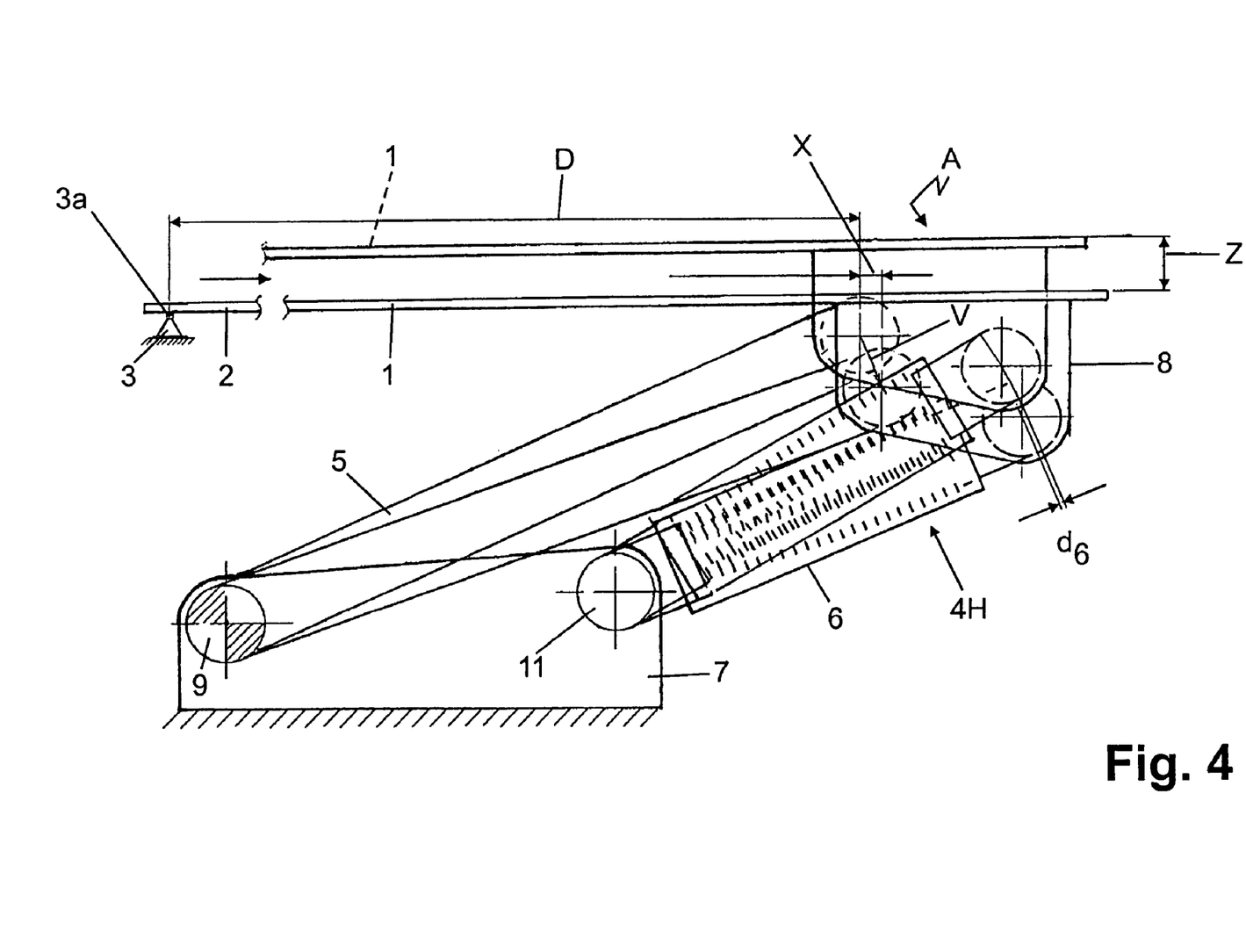
FIG. 4 shows a diagrammatic side view of the four-joint hinge shown in FIGS. 2 and 3 with the front hood overloaded.

FIG. 4 illustrates the overload situation caused by the impact of a pedestrian on the front hood 1 and the resulting deformation of the four-joint hinge 4 overall and in particular of the shorter link 6 in more detail. In FIG. 4, the closed position S is illustrated in dashed lines, while the overload position H caused by the impact of a pedestrian, which is diagrammatically indicated by arrow A, is illustrated in continuous lines. Moreover, FIG. 4 diagrammatically depicts the hood lock 3 which, as can be seen from the diagrammatic illustration, is arranged displaceably on the body, in order to allow a horizontal displacement of the front hood 1 which is associated with pivoting of the front hood 1 about the axis which is formed in the hood lock and is denoted by 3a. It can be seen that the front hood 1, in the region of the hood part 8 mounted on it, executes a displacement travel v, which is illustrated by the arrow drawn on the axis of the rotary joint 10. The travel v is composed of a horizontal component x and a vertical component z, which are likewise shown in FIG. 4. It can therefore be seen that, in the event of a collision with a pedestrian, the front hood is lowered by the amount z, and accordingly reduces its distance from the parts in the engine compartment which may be hard and therefore risk causing injury, while, at the same time, the front hood 1 and therefore also the hood lock 3 are displaced by the amount x toward the rear, as seen in the direction of travel. If the shorter link 6 were, like the longer link 5, of rigid design, the translational movement could not be completed by the four-joint hinge 4, since the four joints 9 to 12 only define one pivoting travel, namely that which forms the basis for the opening movement of the front hood 1, and therefore the translational movement would be statically overdetermined. Since the shorter link 6 is designed so that it can be changed in length, the static overdetermination of the four-joint mechanism 4 is eliminated, and the impact energy produced by the impact of a pedestrian on the front hood 1 is converted into the corresponding deformation energy (and into further energy components which reduce the impact for other reasons). The change in length of the shorter link 6 is denoted by d6 in FIG. 4. It can be seen that for a relatively significant vertical displacement a slight elongation of the shorter link 6 is sufficient, running along a continuous extension curve d by z, so that there is a realistic conversion of the impact energy into deformation energy of the energy store 13. It can also be seen that, as a result of the elongation of the shorter link 6, the angular position of the two links 5 and 6 with respect to one another has changed slightly, this position otherwise statically determining the four-joint mechanism 4.

In the present example, the displacement of the front hood 1 toward the rear is approx. 0.61% of the length D of the front hood 1 or of the effective distance between the hood lock 3 and the rotary joint 10. By comparison, the lengthening of the shorter link 6 is only approximately 0.13% and is therefore less than a quarter of the travel distance x. The change in height z is dependent on the measurement point on the front hood, and in the region of the hood part 8 is approximately twice the length x, i.e. approx. 1.2%.

Unless expressly stated otherwise, in the description of the exemplary embodiments which follows, the same reference numerals denote the same parts as in FIGS. 1 to 4, and to this extent reference is made to the above explanations, in order to avoid repetition.

Figure 5:
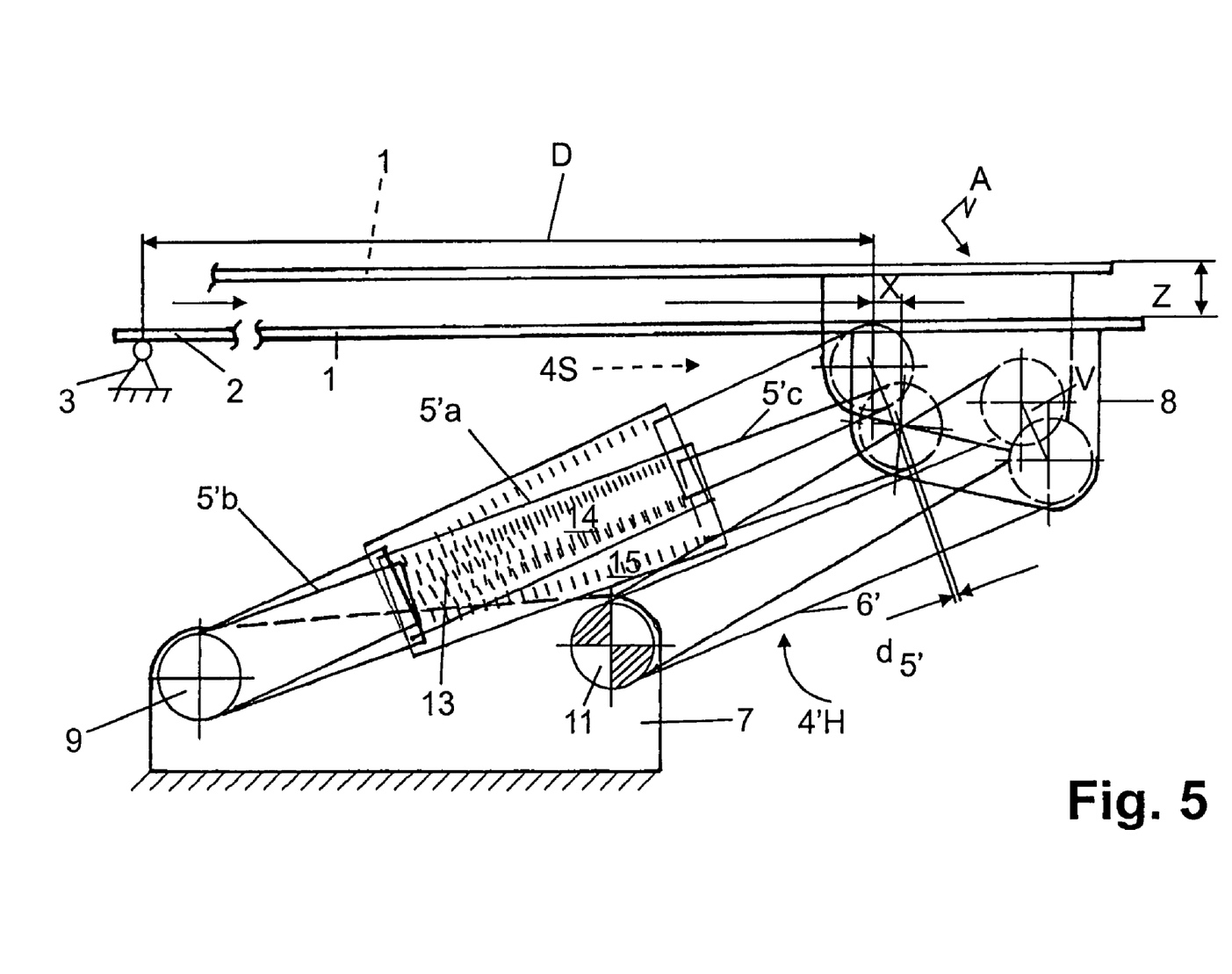
FIG. 5 shows a diagrammatic side view of a further embodiment of a four-joint hinge of the front-hood arrangement shown in FIG. 1 with the front hood closed.

A further embodiment of a four-joint hinge 4' for a front-hood arrangement as shown in FIG. 1 is illustrated in FIG. 5. This front-hood arrangement portrays an outline view of the closed position S of the front hood 1 and, by H, the overload position of the front hood 1.

Figure 3:
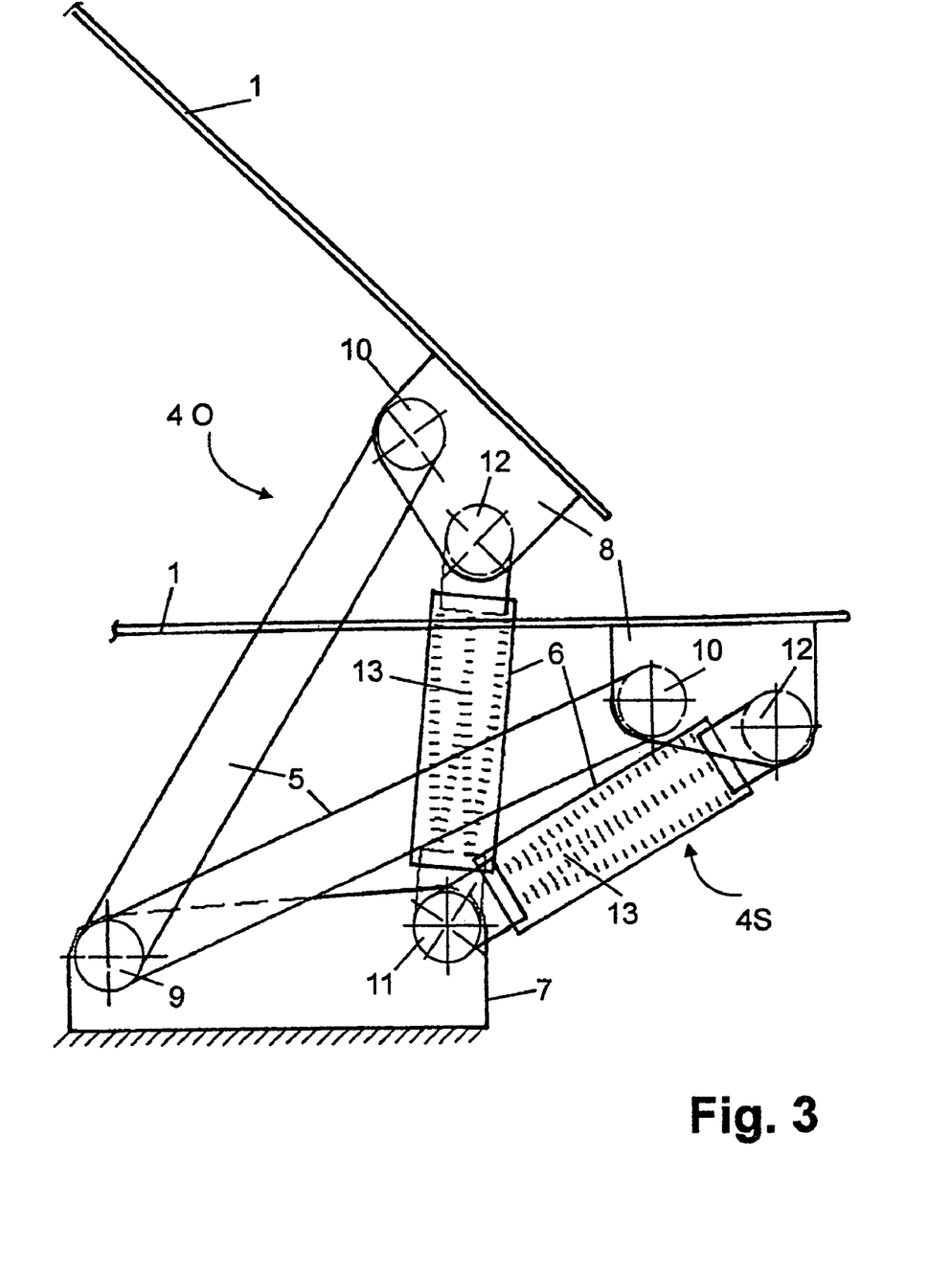
FIG. 3 shows a diagrammatic side view of the four-joint hinge from FIG. 2 with the front hood open.

Unlike in FIGS. 2 to 4, in the present embodiment it is not the shorter link 6' but rather the longer link 5' which is designed so that it can be changed in length, in the embodiment illustrated the horizontal change in length x amounting to approximately 0.76% of the length of the front hood 1 between hood lock 3 and rotary joint 10, while the elongation of the longer link 5' amounts to approximately 0.14% in relation to the overall length of the front hood. The embodiment of the hinge 4 which is shown in FIG. 5 has the advantage, in particular, that in the open position (not shown), most of the dead weight of the front hood 1 together with the hood part 8 arranged thereon is taken up by the shorter link 6' which, however, is designed to be rigid and cannot be changed in length, so that the energy store 13, which is to be provided as a tension spring, can be better adapted to the impact characteristics, while the compression spring 15 may if appropriate be of weaker design or omitted. The structure of the link 5' with parts 5'a, 5'b and 5'c corresponds to the structure of the link 6 which can be changed in length shown in FIGS. 2 to 4.

Figure 6:
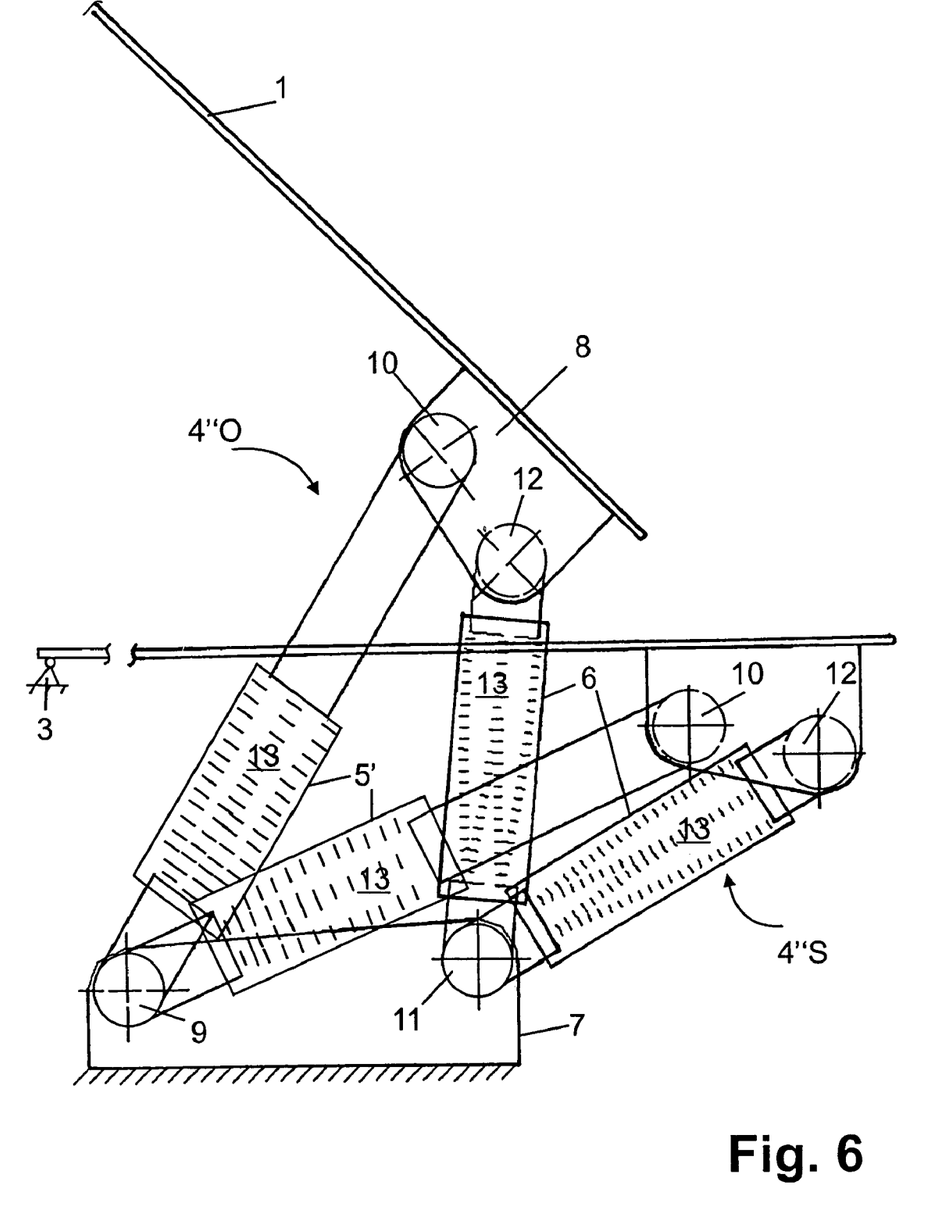
FIG. 6 shows a diagrammatic side view of a further embodiment of a four-joint hinge of the front-hood arrangement from FIG. 1 with the front hood closed and open.
Figure 7:
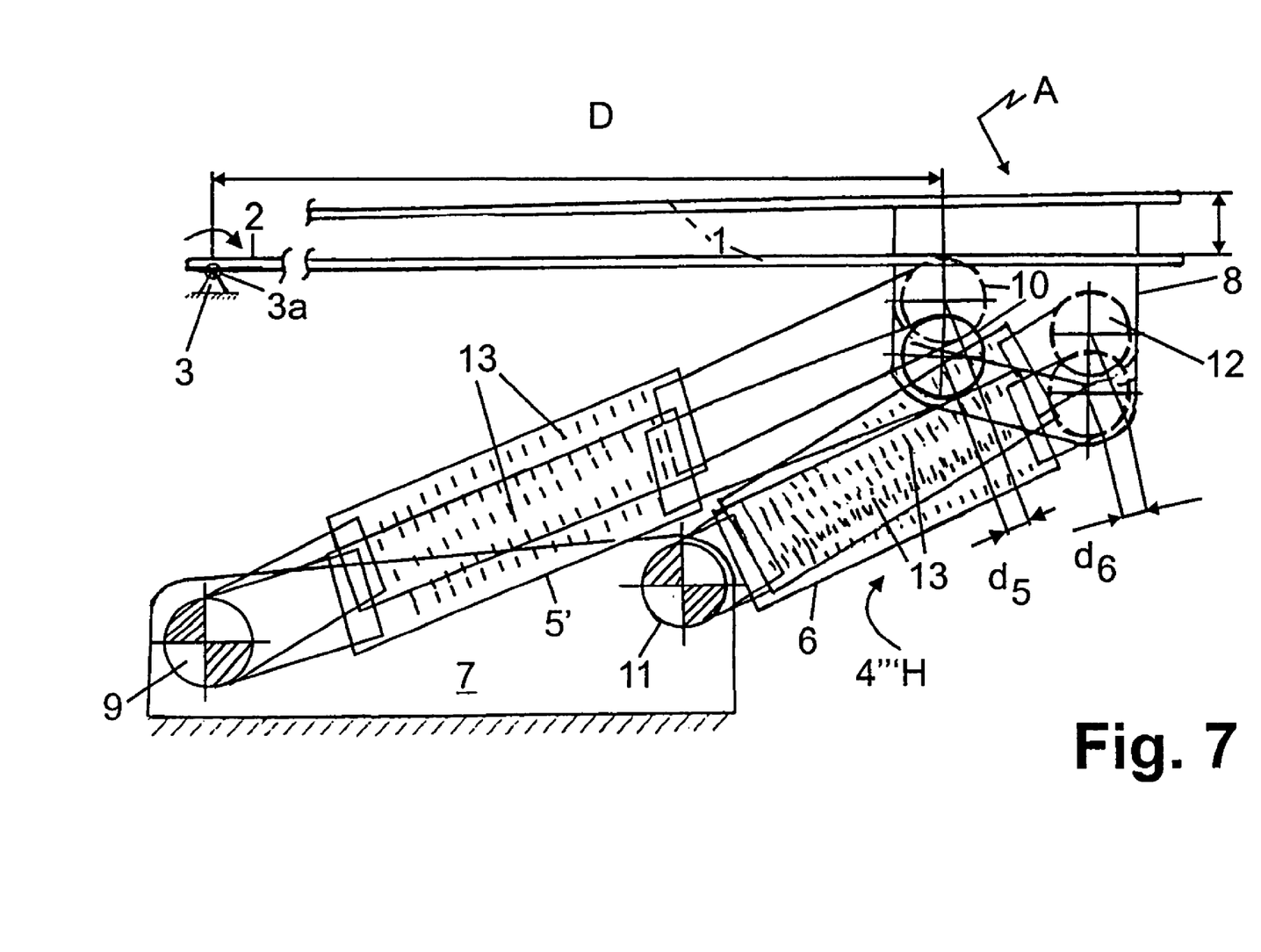
FIG. 7 shows a diagrammatic side view of the four-joint hinge from FIG. 6 with the front hood overloaded.

FIGS. 6 and 7 show a further embodiment 4" of a four-joint hinge for a front-hood arrangement as shown in FIG. 1, in this arrangement the longer link 5' and the shorter link 6 both being designed with an energy store 13, which does not necessarily have to be identical. This particularly preferred refinement of the four-joint hinge 4" has the particular advantage that the hood lock 3 only defines an axis of rotation about the hood lock axis 3a and, on account of the difference between the change in length d5 of the longer link 5' and the change in length d6 of the shorter link 6, compensates for the horizontal displacement of the front hood 1, which is required in the previous exemplary embodiments, and therefore of the hood lock 3. The front hood 1 therefore pivots about the axis 3a of the hood lock 3, and only the height of the front hood 1 is changed, starting from the closed position illustrated as a dashed line in FIG. 7 into the overload position H illustrated as a continuous line. It can be seen that the change in length of the longer link 5' is less than that of the shorter link 6, the length of both links 5' and 6 being compressed. Accordingly, in both links 5' and 6 the energy store 13 is designed as a compression spring, with the result that, advantageously, when the front hood 1 is pivoted into the open position O, which is illustrated as a continuous line in FIG. 6, out of the closed position S, which is illustrated as a dashed line in FIG. 6, the dead weight of the front hood 1 is absorbed by the same compression springs.

Figure 8:
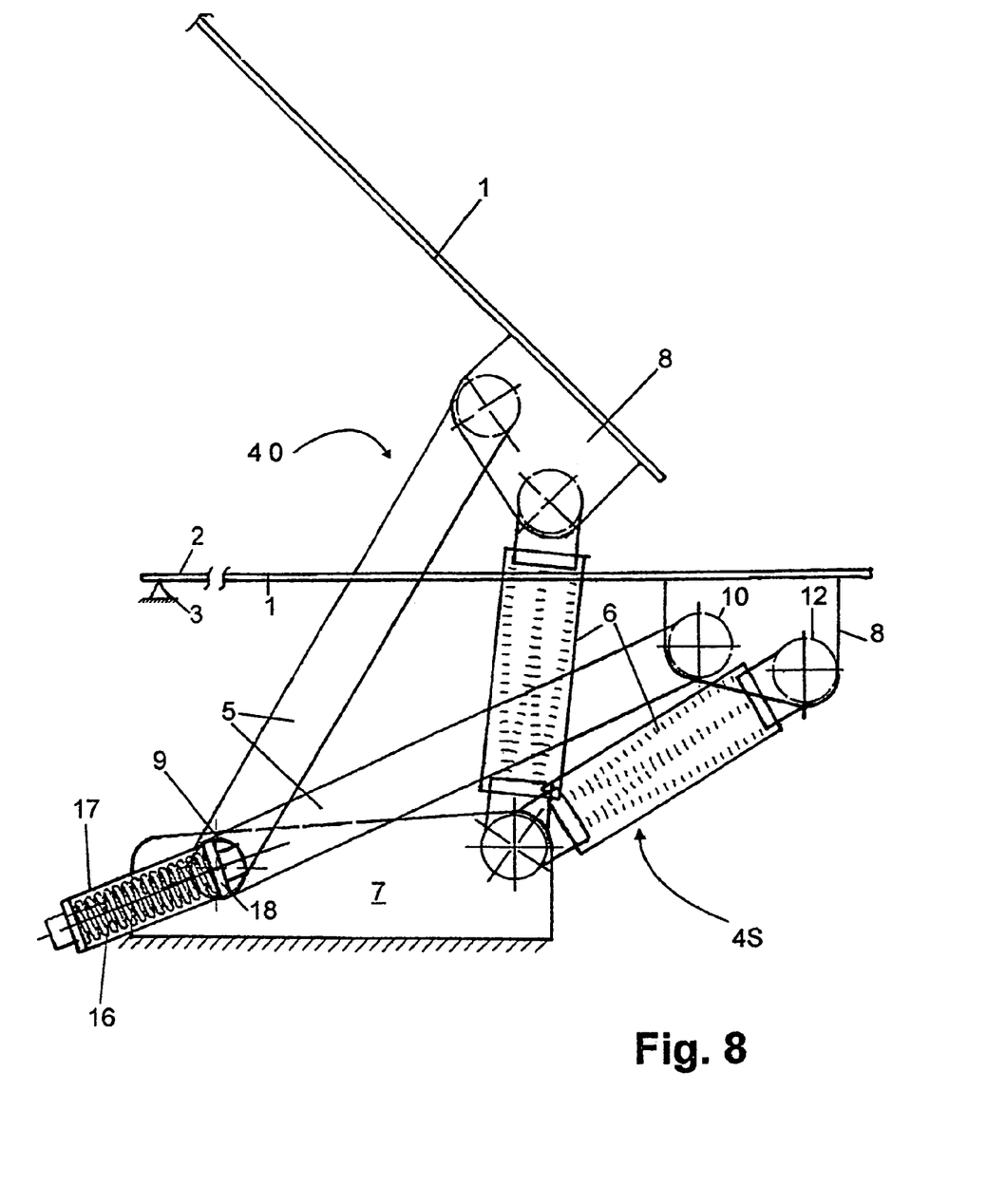
FIG. 8 shows a diagrammatic side view of a further embodiment of a four-joint hinge of the front-hood arrangement shown in FIG. 1 with the front hood closed and open.
Figure 9:
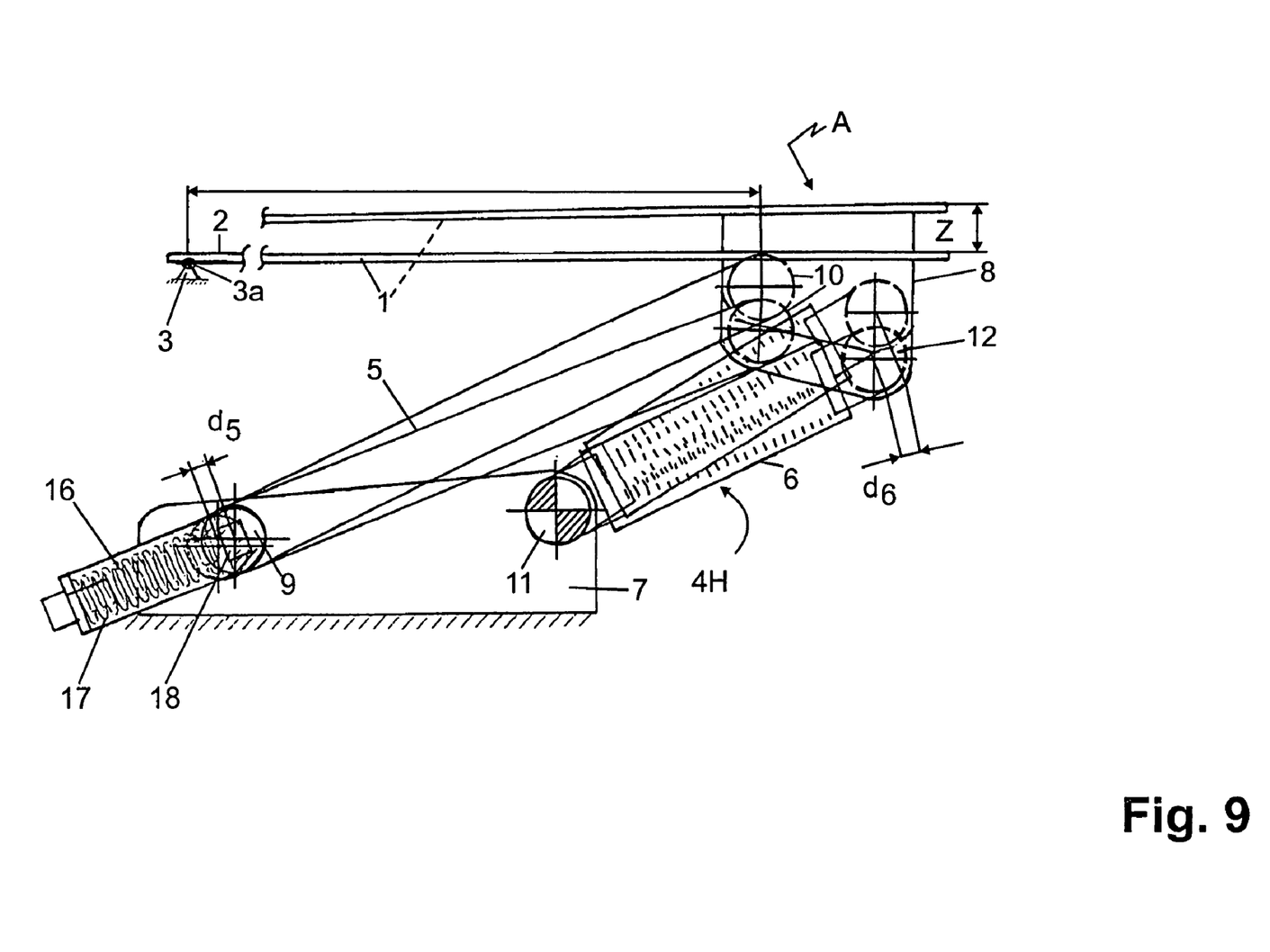
FIG. 9 shows a diagrammatic side view of the four-joint hinge from FIG. 8 with the front hood overloaded.

A further advantageous embodiment of a four-joint hinge 4 for the front-hood arrangement from FIG. 1 is illustrated in FIGS. 8 and 9, which shows a refinement of the front-hood arrangement from FIGS. 1 to 4 with four-joint hinge 4, this refinement also being suitable for the four-joint hinges 4' and 4". In the refined front-hood arrangement, one of the rotation points 9 and 11 of the longer link 5 or shorter link 6 is not mounted rigidly in the frame part 7, but rather can be compressed relative to the frame part 7 counter to the prestress of an energy storage unit 16, which is designed as a compression spring, substantially as an extension of the extent of the longer link 5 assigned to the spring 16. This makes the position of the rotary joint 9 variable, with the result that the hood lock 3 does not need to execute a horizontal displacement x as in FIG. 4, but rather the front hood 1 only executes a pivoting movement about the axis 3a of the hood lock 3.

In the embodiment shown in FIGS. 8 and 9, the energy storage unit 16 is arranged approximately as an axial extension of the longer link 5 and bears its rotary joint 9 assigned to the frame part 7 on a slide 18 arranged in a guide 17. The guide 17, which is integrated in the frame part 7, is substantially aligned with the extent of the longer link 5 in the event of a load H, on account of the load of an impact A of a pedestrian. In a similar manner to the embodiment shown in FIGS. 6 and 7, the shorter link 6 is compressed on the basis of the energy store 13, which is preferably designed as a compression spring and the sum of which is greater than the compression of the energy storage unit 16 caused by the displacement of the rotary joint 9. The particular advantage of the present embodiment is that, in the open position of the front-hood arrangement which is indicated by O in FIG. 8, the link 5 has rotated relative to the axis of the receiving part 17 for the energy storage unit 16 in such a manner that there is no possibility of the latter giving way.

The invention has been explained in more detail above with reference to various exemplary embodiments which have all shown energy stores which are designed to be reversible, as springs, which are particularly preferred. It will be understood that, in the same way as the springs, it is also possible to provide plastically changeable material components which effect an irreversible change in length of the link 5' and/or 6, which is designed to change in length, which represents a lower mechanical outlay during assembly and manufacture.

What is claimed is:

1. A front hood assembly for attachment to a vehicle, comprising
    a front hood;
    at least one hood lock for closing said front hood, and
    at least one multiple-joint hinge comprising a first link and a second link for coupling said front hood to a frame of said vehicle,
    wherein at least one of said first link and said second link is designed to change in length,
    wherein under the load of an impact of said front hood with a pedestrian, said front hood is capable of displacing to an overload position,
    wherein said at least one of said first link and said second link that is designed to change in length is pivoted with respect to both the frame and the front hood when the front hood is opened;
    wherein said multiple-joint hinge is designed as a four-joint hinge and wherein the four joints include two rotary joints of said first link and two rotary joints of said second link.

2. The front hood assembly as claimed in claim 1, wherein both of said first link and said second link are designed to change in length.

3. The front hood assembly as claimed in claim 1, wherein said vehicle comprises a windshield, and
    wherein, at the same time as said at least one link changes in length, said front hood executes a translational movement in the direction toward said windshield of said vehicle.

4. The front hood assembly as claimed in claim 1,
    wherein one link of said first and second links is designed to change in length and wherein the other link of said first and second links is coupled to said front hood via a front hood rotary joint that is assigned to said front hood and coupled to a said frame via a frame rotary joint that is assigned to said frame,
    wherein at least one of said frame rotary joint and said hood rotary joint comprises a displaceable energy storage unit that is prestressed toward an at-rest position of said at least one rotary joint,
    wherein, in the event of an impact, said other link, by means of said displaceable rotary joint, stresses said energy storage unit counter to a prestress direction of said energy storage unit,
    wherein the change in length of said at least one link is at least partially compensated for by a corresponding change in position of said displaceable rotary joint.

5. The front hood assembly as claimed in claim 4,
    wherein said energy storage unit is arranged mainly as an axial extension of said other link when said front hood, starting from a closed position, is being displaced toward said overload position in the event of an impact on said front hood.

6. The front hood assembly as claimed in claim 1,
    wherein said hood lock allows horizontal displacement of said front hood in a closed position of said hood lock.

7. The front hood assembly as claimed in claim 6, wherein said hood lock overall is displaceable.

8. The front hood assembly as claimed in claim 6,
    wherein said hood lock comprises a yield space adjoining said closed position, and
    wherein said yield space provides defined guidance for a substantially horizontal displacement in a rearward direction of one of said front hood and of a holding part connected to said front hood.

9. The front hood assembly as claimed in claim 6,
    wherein an energy storage member prestresses said hood lock in the direction opposite to the direction of a horizontal displacement,
    wherein, in the event of an impact, said energy storage member can be stressed to absorb some of the energy from the impact.

10. The front hood assembly as claimed in claim 1,
    wherein said at least one link that is designed to change in length comprises two rotation points that are separated by a distance, and
    wherein said distance between said two rotation points increases in the event of an impact of a pedestrian with said front hood.

11. The front hood assembly as claimed in claim 1,
    wherein said multiple-joint hinge can be operated to open and close said front hood pivoting said first link and said second link when said hood lock is released without changing the length of said at least one link of said multiple-joint hinge.

12. The front hood assembly as claimed in claim 1,
    wherein said at least one link, which is designed to change in length, is of telescopic design.

13. The front hood assembly as claimed in claim 1,
    wherein said multiple-joint hinge, when the vehicle is ready to drive, is arranged in a resilient, raised position.

14. A front hood assembly for attachment to a vehicle, comprising
    a front hood;
    at least one hood lock for closing said front hood, and
    at least one multiple-joint hinge comprising a first link and a second link for coupling said front hood to a frame of said vehicle,
    wherein at least one of said first link and said second link is designed to change in length,
    wherein under the load of an impact of said front hood with a pedestrian, said front hood is capable of displacing to an overload position,
    wherein said at least one of said first link and said second link that is designed to change in length is pivoted with respect to both the frame and the front hood when the front hood is opened;
    wherein said at least one of said first link and said second link that is designed to change in length comprises an integrated portion for storing energy, the change in length of said at least one of said first link and said second link being effected through stressing of said portion using the energy of the impact.

15. The front hood assembly as claimed in claim 14, wherein said portion includes a spring.

16. The front hood assembly as claimed in claim 14,
    wherein said portion comprises a deformable component that converts the impact energy into deformation energy through plastic deformation of said deformable component.

17. The front hood assembly as claimed in claim 14,
    wherein said front hood comprises two sides, and
    wherein said at least one multiple-joint hinge includes one multiple-joint hinge, arranged on each of the two sides of said front hood.

18. The front hood assembly as claimed in claim 14, wherein said multiple-joint hinge is designed as a seven-joint hinge.

19. A front hood assembly for attachment to a vehicle, comprising a front hood;

at least one hood lock for closing said front hood, and at least one multiple-joint hinge comprising a first link and a second link for coupling said front hood to a frame of said vehicle, wherein at least one of said first link and said second link is designed to change in length, wherein under the load of an impact of said front hood with a pedestrian, said front hood is capable of displacing to an overload position, wherein said at least one of said first link and said second link that is designed to change in length is pivoted with respect to both the frame and the front hood when the front hood is opened;

wherein one link of said first and second links is designed to change in length and wherein the other link of said first and second links is coupled to said front hood via a front hood rotary joint that is assigned to said front hood and is coupled to a said frame via a frame rotary joint that is assigned to said frame, wherein, in the event of an impact of a pedestrian on said front hood, said front hood rotary joint executes a defined movement about said frame rotary joint.

20. A front hood assembly for attachment to a vehicle, comprising a front hood;

at least one hood lock for closing said front hood, and at least one hinge comprising a lever arm including a first joint assigned to said front hood and a second joint assigned to a frame of said vehicle, wherein said at least one hood lock is arranged in a frontal region of said front hood and said at least one hinge is arranged in a rear region of said front hood, wherein said lever arm is designed to change in length under a load on said lever arm of an impact of said vehicle with a pedestrian, and wherein said front hood is capable of displacing to an overload position, in which the rear region of the front hood is lowered.

21. The front hood assembly as claimed in claim 20, wherein said lever arm includes an integrated portion for storing energy, the change in length of the lever arm being effected through stressing of the portion using energy provided by the load on the lever arm.

22. The front hood assembly as claimed in claim 21, wherein said portion includes a spring.

23. The front hood assembly as claimed in claim 21, wherein said portion comprises a deformable component that converts the energy into deformation energy through plastic deformation of said deformable component.

24. The front hood assembly as claimed in claim 20, wherein said front hood comprises two sides, and wherein said at least one multiple-joint hinge includes one multiple-joint hinge, arranged on each of the two sides of said front hood.

25. The front hood assembly as claimed in claim 20, wherein said vehicle comprises a windshield, and wherein, at the same time as said at least one link changes in length, said front hood executes a translational movement in the direction toward said windshield of said vehicle.

26. The front hood assembly as claimed in claim 20, wherein said hood lock allows horizontal displacement of said front hood in a closed position of said hood lock.

27. The front hood assembly as claimed in claim 20, wherein said hood lock overall is displaceable.

28. The front hood assembly as claimed in claim 20, wherein the hood lock remains locked during the displacing of said front hood to said overload position.

29. The front hood assembly as claimed in claim 20, wherein the rear region of the front hood, in said overload position, is lowered below the level of said rear region of the closed front hood.

\* \* \* \* \*